United States Patent [19]

Maebe

[11] Patent Number: 4,506,902
[45] Date of Patent: Mar. 26, 1985

[54] BICYCLE WITH STEERABLE WHEELS

[76] Inventor: Richard M. Maebe, 3026 Wenwood, La Verne, Calif. 91750

[21] Appl. No.: 417,022

[22] Filed: Sep. 13, 1982

[51] Int. Cl.³ .............................................. B62K 21/00
[52] U.S. Cl. ..................................... 280/266; 280/267
[58] Field of Search ........................ 280/267, 266, 235

[56] References Cited

U.S. PATENT DOCUMENTS

| 602,034 | 4/1898 | Murphy | 280/266 |
| 633,764 | 9/1899 | Anderson | 280/266 |
| 3,860,264 | 1/1975 | Douglas et al. | 280/266 |

FOREIGN PATENT DOCUMENTS

| 817539 | 7/1959 | United Kingdom | 280/267 |
| 1433799 | 4/1976 | United Kingdom | 280/267 |

Primary Examiner—John A. Pekar
Attorney, Agent, or Firm—Knobbe, Martens, Olson & Bear

[57] ABSTRACT

A bicycle comprises front and rear wheel assemblies which are independently steerable. The rear wheel assembly includes a pedal crank which is mounted on the axle of the rear tire. A rear fork holds the rear axle and includes a shaft which is rotatably coupled to a rear portion of the bicycle frame. A saddle is mounted to the top of the shaft of the rear fork. Turning the saddle and/or the pedal crank laterally rotates the rear wheel assembly independently of the front wheel assembly. The front wheel assembly similarly includes a fork which holds the axle of the front tire. A shaft portion of the fork is rotatably coupled to a front portion of the bicycle frame and is coupled to a handlebar. Turning the handlebar rotates the front wheel assembly independently of the rear wheel assembly. The frame retains the front and rear wheel assemblies in a plane which is substantially perpendicular to the plane in which the bicycle is ridden to provide a greater degree of stability and to facilitate the independent steering of the front and rear wheel assemblies.

4 Claims, 2 Drawing Figures

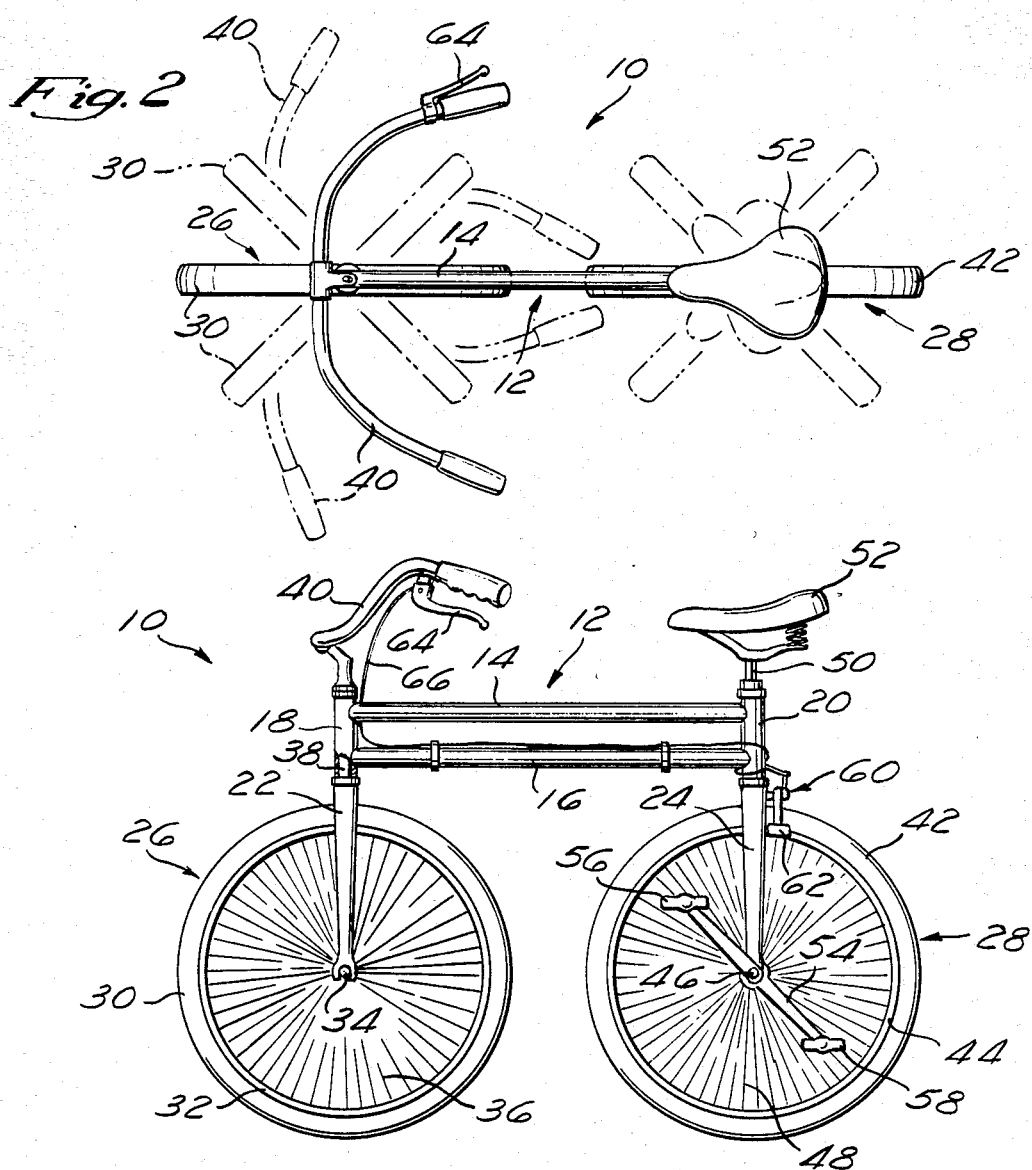

4,506,902

BICYCLE WITH STEERABLE WHEELS

BACKGROUND OF THE INVENTION

This invention is generally related to bicycles, and more specifically, to a bicycle having front and rear wheels which are independently steerable.

Bicycles having front and rear wheels which are steerable relative to one another and relative to a main frame have been disclosed in the past and are well known in the art. Disclosures of such bicycles generally teach equal angular displacements of the front and rear wheels relative to the main frame. In most applications, the movement of one wheel causes an equal and opposite movement of the other wheel. The central purpose of this type of bicycle is to enhance performance by decreasing the turning radius of the bicycle.

Great Britain Pat. No. 817,539 to George discloses a bicycle having dependently steered front and rear wheels as discussed above. The George patent teaches a bicycle having two steering heads, one at the front of the bicycle and the other at the rear. The steering heads are provided with hydraulic coupling in order to ensure synchronous, equal, and opposite steering movements of the front and rear wheels. Whereas the type of bicycle which the George patent discloses allegedly enhances bicycle performance, it does not provide a challenging alternative to conventional bicycle riding.

Great Britain Pat. No. 1,433,799 to Belden discloses a bicycle having independently steerable front and rear wheels. The front and rear wheels are independently steered around separate axes of rotation. To operate the Belden bicycle, a rider positions himself astraddle a main frame and upon a seat which is vertically adjustable but otherwise immovably fastened to the main frame. The rider steers the front wheel assembly by manipulating handle bars coupled thereto. The rider can independently steer the rear wheel assembly by lateral podiatric movement of a pedal crank which is coupled by a chain to the rear wheel assembly cog.

Whereas the Belden disclosure alleges to provide a challenging alternative to conventional bicycle riding, it has a number of significant disadvantages. Due to the conventional placement of the pedal crank midway between the front and rear wheel assemblies and directly below the fixed main frame, it is extremely difficult to steer the rear wheel assembly while keeping both feet on the pedal crank. Further, because the seat is immovably mounted upon the main frame and is not in any manner used to aid in steering the rear wheel assembly, it becomes even more difficult to steer the rear wheel assembly while simultaneously rotating the pedal crank to propel the bicycle. Additionally, the axis of rotation for the front and rear wheel assemblies lie in planes which are deviated from a plane which is perependicular to the riding surface. The result is to increase instability of the bicycle and to impede steering the wheel assemblies.

There therefore exists a need to provide a bicycle which has independently steerable front and rear wheels to provide a challenging alternative to conventional bicycle riding while simultaneously being stable and functional.

SUMMARY OF THE INVENTION

The present invention provides an improved bicycle with front and rear wheel assemblies which are independently steerable. A bicycle according to the invention provides a more challenging alternative to riding a conventional bicycle or bicycles having wheel assemblies which are steered relative to one another. In addition, the various means for sitting upon, propelling, and steering the bicycle are positioned in such a manner as to enhance performance and increase stability as compared to previously disclosed bicycles.

Accordingly, the present invention provides a bicycle comprising a frame having a front journal and a rear journal. A front wheel assembly is rotatably coupled to the frame within the front journal. A rear wheel assembly is rotatably coupled to the frame within the rear journal. The bicycle includes means for steering the front wheel assembly independently of the rear wheel assembly. Means for steering the rear wheel assembly independently of the front wheel assembly includes a pedal crank coupled to the rear wheel assembly and a saddle mounted on top of the rear wheel assembly and rotatable therewith.

These and other advantages will be discussed in the following section with reference to the drawings, in which:

BRIEF DESCRIPTION OF THE DRAWINGS

FIG. 1 is a side elevation view of a bicycle according to the invention;

FIG. 2 is a plan view of a bicycle of FIG. 1.

DESCRIPTION OF THE PREFERRED EMBODIMENT

Referring to FIG. 1, a bicycle 10 is shown having a frame 12 which is comprised of a pair of spaced and parallel longitudinal members 14 and 16. A front journal 18 is coupled to the front end of the members 14 and 16. Similarly, a rear journal 20 is coupled to the rear end of the members 14 and 16. Journals 18 and 20 are well known in the art and include internal bearings (not shown) for supporting a front fork 22 and a rear fork 24, which provide means for connecting a front wheel assembly 26 and a rear wheel assembly 28, respectively, to the frame 12.

By spacing members 14 and 16 apart, the front and rear journals 18 and 20 are prevented from deviating from a substantially perpendicular orientation relative to the plane in which the bicycle is ridden. In addition, longitudinal members 14 and 16 ensure that the front and rear wheel assemblies 26 and 28 remain a predetermined distance apart. The result is to facilitate the rider's becoming accustomed to the position in which he must attempt to ride the bicycle 10. Further, since the wheel assemblies 26 and 28 rotate around perpendicular axes, it is easy to steer the bicycle 10, as it is not necessary to counteract forces which are prevalent in prior art bicycles having wheel assemblies which rotate around axes which are not substantially perpendicular to the riding plane. The constant riding position and ease in which the wheel assemblies 26 and 28 are independently rotatable provide a bicycle 10 which is more stable than bicycles disclosed in the past.

The front wheel assembly 26 includes a front tire 30 which is mounted on a rim 32. The rim 32 is coupled to an axle 34 by a plurality of spokes 36. The axle 34 is retained in a lower end of the front fork 22. A top portion of the fork 22 comprises a shaft 38 which is rotatably mounted within the front journal 18. A handlebar 40 is coupled to a top portion of the shaft 38. Thus, turning the handlebar 40 causes the shaft 38 to rotate within the front journal 18, causing the front tire 30 to rotate about an axis generally parallel to the length of the shaft 38.

The rear wheel assembly 28 similarly comprises a rear tire 42 mounted on a rim 44. The rim 44 is coupled to a rear axle 46 by a plurality of spokes 48. The rear axle 46 is retained in the lower end of the rear fork 24. A top portion of the rear fork 24 comprises a shaft 50 which is rotatably mounted within the rear journal 20. A saddle 52 is mounted to the rear shaft 50 so as to be vertically adjustable, but otherwise immovably coupled relative to the rear shaft 50. As a result, a rider can steer the rear wheel assembly 28 by rotating the saddle 52 to cause the shaft 50 to rotate within the rear journal 20, hence steering the rear wheel 42. In addition, a pedal crank 54 having a pair of pedals 56 and 58 connected thereto is mounted to the rear axle 46. It can be seen that by rotating the pedal crank 54 in either a clockwise or counter-clockwise direction, the bicycle 10 can be made to travel in either a forward or backward direction. Additionally, the coupling of the pedal crank 54 directly to the rear axle 46 provides another means for steering the rear wheel assembly 28.

The bicycle 10, as shown in FIGS. 1 and 2, may include braking means such as a caliper brake assembly 60. The brake assembly 60 is mounted on the rear wheel assembly 28, preferrably on the rear fork 24. The brake assembly 62 includes a brake pad 62 on each side of the rim 44. A brake hand lever 64 is mounted on either side of the front handlebar 40, and is coupled to the brake assembly 60 via a brake cable 66. To activate the brake assembly 60, light pressure is applied to the hand lever 64, causing the cable 66 to force the brake pads 62 against the rim 44. The resulting friction between the brake pads 62 and the rim 44 decreases the angular velocity of the rim 44 to control the velocity of the bicycle 10.

FIG. 2 shows the separate axes of rotation of the front and rear wheel assemblies 26 and 28. It is readily apparent that the front wheel assembly 26 is steered independently of the rear wheel assembly 28 by the handlebar 40. The rear wheel assembly 28 is steered independently of the front wheel assembly 26 by laterally rotating the saddle 52 and the pedal crank 54 about an axis parallel with the length of the shaft 50.

The bicycle 10 as described above provides a challenging alternative to riding conventional bicycles. Correctly riding the bicycle 10 demands that the rider obtain the skill required to independently steer the front and rear wheel assemblies 26 and 28 while simultaneously propelling the bicycle 10 by pedalling the pedal crank 54 in either a forward or backward direction.

What is claimed is:
1. A riding apparatus comprising:
   (a) a frame having a front portion, a middle portion, and a rear portion;
   (b) a front wheel assembly rotatably coupled to said front portion of said frame;
   (c) a rear wheel assembly rotatably coupled to said rear portion of said frame, said rear wheel assembly further comprising:
   a rear axle;
   a rear tire coupled to said rear axle; and
   a rear fork retaining said rear axle, said rear fork having a shaft at one end thereof rotatably mounted within said frame;
   (d) means for steering said front wheel assembly independently of said rear wheel assembly;
   (e) saddle means connected to the rear wheel assembly for supporting a rider and for steering said rear wheel assembly independently of said front wheel assembly;
   (f) means for pivoting said saddle means independently of said front and middle frame portions; and
   (g) a pedal means for propelling said riding apparatus and for steering said rear wheel assembly independently of said front wheel assembly, said pedal means fixedly mounted to said rear axle, said pedal means causing said shaft of said rear fork to rotate within said frame to steer said rear tire.
2. A riding apparatus as defined in claim 1 wherein said saddle means is coupled to said shaft of said rear fork, said saddle means causing said shaft of said rear fork to rotate within said frame to steer said rear tire.
3. A riding apparatus comprising:
   (a) a frame having a front portion and a rear portion, said frame further comprising first and second longitudinal members separated by a distance, said first and second longitudinal members being parallel to each other and to the plane in which the apparatus is ridden, said longitudinal members being coupled to said front and rear journals to retain said front and rear journals in a plane pependicular to said longitudinal members and said plane in which the apparatus is ridden;
   (b) a front wheel assembly rotatably coupled to said front portion of said frame;
   (c) front journal means for rotatably mounting said front wheel assembly to said frame;
   (d) a rear wheel assembly rotatably coupled to said rear portion of said frame;
   (e) means for steering said front wheel assembly independently of said rear wheel assembly; and
   (f) saddle means for supporting a rider and for steering said rear wheel assembly independently of said front wheel assembly.
4. A riding apparatus comprising:
   (a) a frame having a front portion, a middle portion, and a rear portion;
   (b) a front wheel assembly rotatably coupled to said front portion of said frame;
   (c) a rear wheel assembly rotatably coupled to said rear portion of said frame;
   (d) means for steering said front wheel assembly independently of said rear wheel assembly;
   (e) saddle means connected to the rear wheel assembly for supporting a rider and for steering said rear wheel assembly independently of said front wheel assembly;
   (f) means for pivoting said saddle means independently of said front and middle frame portions; and
   (g) a pedal means for propelling said riding apparatus and for steering said rear wheel assembly independently of said front wheel assembly, said pedal means rotating a rear wheel in either a clockwise or a counter-clockwise direction.

* * * * *